United States Patent
Keslassy et al.

(10) Patent No.: US 7,489,638 B2
(45) Date of Patent: Feb. 10, 2009

(54) SCHEDULING WITH DELAYED GRAPHS FOR COMMUNICATION NETWORKS

(75) Inventors: Isaac Keslassy, Paris (FR); Muralidharan S. Kodialam, Marlboro, NJ (US); Tirunell V. Lakshman, Morganville, NJ (US); Dimitrios Stiliadis, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1017 days.

(21) Appl. No.: 10/820,596

(22) Filed: Apr. 8, 2004

(65) Prior Publication Data
US 2005/0226214 A1 Oct. 13, 2005

(51) Int. Cl.
*G01R 31/08* (2006.01)
*H04L 12/28* (2006.01)
*H04J 15/00* (2006.01)

(52) U.S. Cl. ............... 370/238; 370/241; 370/229; 370/235; 370/351; 370/464

(58) Field of Classification Search ............. 370/254, 370/252, 238
See application file for complete search history.

(56) References Cited

U.S. PATENT DOCUMENTS

| 5,392,221 | A * | 2/1995 | Donath et al. ............... 716/6 |
| 5,418,779 | A * | 5/1995 | Yemini et al. ............ 370/256 |
| 6,219,704 | B1 * | 4/2001 | Kim et al. ................. 709/224 |
| 6,304,639 | B1 * | 10/2001 | Malomsoky et al. ... 379/112.04 |
| 6,351,461 | B1 * | 2/2002 | Sakoda et al. ............. 370/335 |
| 6,400,699 | B1 * | 6/2002 | Airy et al. ................. 370/329 |
| 6,477,144 | B1 * | 11/2002 | Morris et al. ............ 370/230.1 |
| 6,567,387 | B1 * | 5/2003 | Dulin et al. ................ 370/329 |
| 6,704,312 | B1 * | 3/2004 | Chang et al. .............. 370/389 |
| 6,721,270 | B1 * | 4/2004 | Mitra et al. ................ 370/230 |
| 6,862,272 | B2 * | 3/2005 | Dulin et al. ................ 370/330 |
| 6,925,061 | B2 * | 8/2005 | Lee et al. ................... 370/238 |
| 7,310,303 | B2 * | 12/2007 | Koo et al. .................. 370/206 |
| 2002/0055356 | A1 * | 5/2002 | Dulin et al. ................ 455/422 |
| 2003/0198179 | A1 * | 10/2003 | Koo et al. .................. 370/208 |
| 2003/0202485 | A1 * | 10/2003 | Mansfield .................. 370/328 |
| 2005/0041573 | A1 * | 2/2005 | Eom et al. .................. 370/208 |
| 2005/0195791 | A1 * | 9/2005 | Sung et al. ................. 370/342 |
| 2007/0280261 | A1 * | 12/2007 | Szymanski .............. 370/395.4 |

OTHER PUBLICATIONS

"On Service Guarantees for Input Buffered Crossbar Switches: A Capacity Decomposition Approach by Birkhoff and von Neumann," by Chen-Shang Chang, W. J. Chen and H.Y. Huang, *IEEE IWQoS'99*, Napa, California, 1999, pp. 235-244.
"Load Balanced Birkhoff-von Neumann Switches, Part I: One-stage Buffering," by Cheng-Shang Chang, Duan-Shin Lee, and Yi-Shean Jou, *IEEE HPSR '01*, Dallas, May 2001, pp. 1-25.

* cited by examiner

*Primary Examiner*—Huy D Vu
*Assistant Examiner*—Maxwell A Clark

(57) ABSTRACT

A network of nodes interconnected by links, such as a wavelength division multiplexing (WDM) ring network, is modeled by a delayed graph in which propagation delay between nodes is accounted for. Given the delayed graph, a traffic matrix for an admissible traffic pattern is scheduled over a frame period. Scheduling of the traffic matrix formulates a set of scheduling constraints based on the delays and decomposes the traffic matrix into a set of transmission matrices. Each of the set of transmission matrices is scheduled over the frame period.

38 Claims, 7 Drawing Sheets

SCHEDULING WITH DELAYED GRAPHS FOR COMMUNICATION NETWORKS

BACKGROUND OF THE INVENTION

1. Field of the Invention

The present invention relates to scheduling data transfer between nodes in a communications network, and, more particularly, to generating a schedule using graphs.

2. Description of the Related Art

Wavelength Division Multiplexing (WDM) is commonly employed for optical transport networks. WDM technology is applied to both optical ring architectures and mesh networks. A transport WDM optical ring consists of a number N of nodes connected through optical links in a ring topology. Each node can add or drop one or more wavelengths, and each node passes-through the rest of the wavelengths. In many WDM systems, a dedicated wavelength is assigned between any two nodes requiring a communication path, and traffic management is performed with wavelength granularity.

The cost of each WDM node is determined by: i) the number of optical transmitters and receivers corresponding to the number of wavelengths that are added/dropped at each node and ii) the circuitry and memory bandwidth required to process traffic that is added/dropped at each node. In the worst case, which is observed in the case of uniform traffic demands, every node requires a communication path to every other node in the ring, and each node must support at least N transmitters and N receivers.

One problem associated with WDM optical rings is that the granularity of traffic demands is determined by the wavelength granularity, which leads to inefficient resource utilization. If traffic demands are lower than the bandwidth available on a wavelength, then the point-to-point (node-to-node) wavelengths are underutilized. For example, if each wavelength supports a data rate (bandwidth) of 10 Gbp/s, and traffic demand rates are 1 Gbps each, then 90% of the available wavelength bandwidth remains unused.

To increase resource utilization, a WDM optical ring can be implemented with electronic grooming devices. With electronic grooming devices, a wavelength is i) dropped at a node and demultiplexed and/or ii) multiplexed with local traffic and added back to the ring. Although the number of separate wavelength transmitters and/or receivers can be reduced with electronic grooming as opposed to optical grooming, grooming devices add to the network cost. This network cost can be high in terms of equipment cost, added cost of controlling additional devices, sparing, and network management support.

Alternatively, grooming or packet multiplexing services may include optical technologies that are based on optical packet or burst switching. Packet or burst switching allows for sharing of a wavelength between multiple transmitters/receivers in the optical domain and without the need for additional electronic devices. In ring networks, three methods can be used for switching. The first method employs tunable transmitters and fixed receivers (TTFR). With the TTFR method, traffic is transmitted in terms of packets or bursts, and communication between two nodes occurs by tuning the wavelength of the transmitter to the fixed wavelength associated with the receiver. The second method employs fixed transmitters and tunable receivers (FTTR). With the FTTR method, traffic is transmitted in terms of packets or bursts, and communication between two nodes is on a fixed wavelength of the transmitter. The receiver tunes to the wavelength it wishes to receive (equivalent to a "broadcast-and-select" architecture). A third method allows both tunable transmitters and tunable receivers (TTTR), thus providing further flexibility.

Implementing TTFR, FTTR, and TTTR architectures without substantial loss of bandwidth due to slow tuning times of the optical components requires fast tunable lasers in the transmitter or fast tunable optical detectors in the receiver. Recent developments in optical technologies have demonstrated fast tunable lasers with less than 50 ns tuning time. Tuning time might be further reduced to less than 1ns using integrated multi-frequency lasers (MFLs).

A requirement of operation of a WDM optical ring with the TTFR method is that data from two transmitters cannot arrive at the same receiver at the same time, since a given transmitter sends only to one receiver at any given burst (or "time-slot"). When the data from two transmitters arrives at the same receiver, a conflict arises and data is corrupted at the receiver. Propagation delay may cause packets on a given wavelength sent from nodes distant to a given node to overlap packets that are sent from nearer nodes which the given node is attempting to receive. Similar conflicts arise in FTTR and TTTR rings. Therefore, a "contention resolution" mechanism is necessary to prevent such conflicts.

FIGS. 1A, 1B, and 1C illustrate the problem of scheduling in a TTFR ring with long propagation delays. FIGS. 1A, 1B, and 1C each show an exemplary WDM optical ring 100 having three nodes, N1, N2, and N3, where the three nodes are interconnected by equidistant links and where each node/link supports 3 wavelengths. Each link length corresponds to a 1 μs propagation delay (e.g., resulting from a 330 m-distance fiber). WDM optical ring 100 includes a simple traffic matrix that describes the required transfer of packet or burst traffic data between a given pair of network nodes. A traffic matrix is also known as a demand matrix or rate matrix.

For WDM optical ring 100, the traffic matrix specifies every node requires capacity equal to 50% of the wavelength bandwidth to communicate with the other two nodes in the ring. In other words, during one time-slot the node tunes the transmitter to send on one wavelength to one node, and in the next time-slot the node tunes the transmitter to send on the other wavelength to the other node. For WDM optical ring 100, the time-slot (burst) length is 1 μs (i.e., the time-slot length equals the propagation delay). A simple TDMA scheduling of the traffic matrix that achieves this traffic distribution under zero propagation delays is given in Table 1.

TABLE 1

| Node Number | Destination Node In Time-Slot 1 | Destination Node In Time-Slot 2 | Destination Node In Time-Slot 3 |
|---|---|---|---|
| 1 | 2 | 3 | 2 |
| 2 | 3 | 1 | 3 |
| 3 | 1 | 2 | 1 |

Referring to FIG. 1A, at time-slot 1, node N1 transmits packet 101 to node N2, node N2 transmits packet 102 to node N3, and node N3 transmits packet 103 to node N1. Referring to FIG. 1B, at time-slot 2, packets 101, 102, and 103 have reached their destination nodes N2, N3, and N1, respectively. In addition, at time-slot 2, node N1 transmits packet 111 to node N3, node N2 transmits packet 112 to node N1, and node N3 transmits packet 113 to node N2. Thus, during time-slot 2, each packet that a node generates now must traverse one intermediate node before receipt at the destination node.

Referring to FIG. 1C, at time-slot 3, a conflict arises. At time-slot 3, intermediate node N1 attempts to forward packet 113 to the corresponding destination node N2, intermediate node N2 attempts to forward packet 111 to the corresponding destination node N3, and intermediate node N3 attempts to forward packet 112 to the corresponding destination node N1. However, at time-slot 3, the scheduling matrix dictates that node N1 transmit packet 121 to node N2, node N2 transmit packet 122 to node N3, and node N3 transmit packet 123 to node N1. Therefore, at time-slot 3, all three nodes N1, N2, and N3 are attempting to transmit packet data in the same wavelength that is already used by a previous node. For example, node N1 attempts to transmit packet 121 to node N2 while also attempting to forward packet 113 to node N2. The contention illustrated in FIGS. 1A, 1B, and 1C shows that simple scheduling, such as is typically defined in TDMA networks, does not provide 100% throughput in a TTFR ring with large propagation delays.

Two different methods of the prior art might be employed for contention resolution in WDM packet-switched rings. One method is based on per-wavelength power detectors, and the other method is based on an independent control channel. In both of these methods, each node detects the wavelengths that are currently passing through the node, and each node selects an available wavelength (and thus destination) for transmission based on a Medium Access Protocol (MAC).

Contention resolution for networks with propagation delays is not restricted to WDM optical ring networks. In general, contention resolution of the prior art may be extended to other networks of nodes employing switching where scheduling of a traffic matrix accounts for propagation delays.

SUMMARY OF THE INVENTION

In accordance with the present invention, a network of nodes interconnected by links is modeled by a delayed graph in which delays between nodes are accounted for. Given the delayed graph, a traffic matrix for an admissible traffic pattern is scheduled over a period of time termed a frame period. Scheduling of the traffic matrix formulates a set of scheduling constraints based on the delays and decomposes the traffic matrix into a set of transmission matrices based on the set of scheduling constraints. The set of transmission matrices may then be scheduled over the frame period at each node of the network.

In accordance with exemplary embodiments of the present invention, a schedule is generated for two or more nodes of a network by generating i) a network graph accounting for delay between each node of the network and ii) a set of network constraints for the network graph, one or more of the network constraints based on the schedule accounting for each delay. A traffic matrix for the network graph is decomposed into a set of transmission matrices based on the set of network constraints, the set of transmission matrices representing the schedule over a frame period.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2:
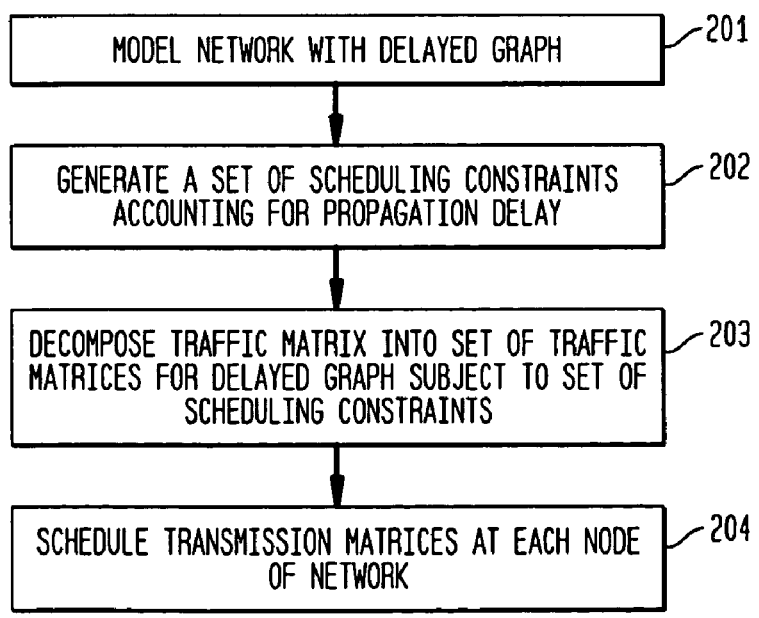
FIG. 2 shows an exemplary method of generating a scheduling scheme accounting for propagation delay in accordance with the present invention.

FIG. 2 shows an exemplary method 200 of generating a network schedule accounting for propagation delay in accordance with the present invention. Exemplary method 200 might be employed in a scheduler of a node in a communications network. The communications network might be a packet- or burst-switched transport network, and the communications network might be either i) a network of electronic switches/routers or ii) optical switches that are connected either with wired or optical links. The communications network as described herein is configured as a ring network, although the present invention may be extended to other types of network configurations that may be modeled with a ring network accounting for delays in accordance with an exemplary embodiment of the present invention.

At step 201, the network is modeled with a delayed graph, and the network has a corresponding rate matrix that characterizing traffic demands through the network. At step 202, a set of scheduling constraints accounting for propagation delay is generated for the delayed graph. At step 203, the rate matrix is decomposed into a set of transmission matrices, the decomposition of the traffic matrix being subject to the scheduling constraints. At step 204, the set of transmission matrices is scheduled at each node of the network.

Figure 3:
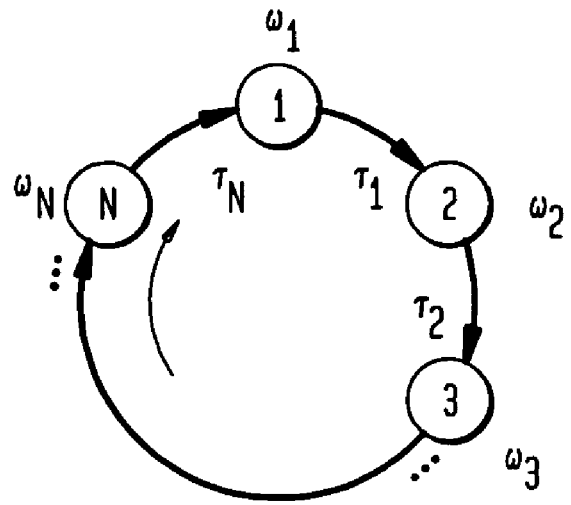
FIG. 3 shows a delayed graph for a ring network accounting for propagation delay in accordance with an exemplary embodiment of the present invention.

The following notation and definitions are described as an aid to understanding the present invention. FIG. 3 shows a delayed graph 300 for a ring network accounting for propagation delay in accordance with an exemplary embodiment of the present invention. Delayed graph 300 may be employed by step 201 of FIG. 2. Delayed graph 300 models a ring (e.g., a WDM optical ring network) with N nodes labeled $\{1, 2, \ldots N\}$. As shown in FIG. 3, traffic propagates clockwise.

For the exemplary embodiment, each node has a fast tunable transmitter and a fixed receiver (TTFR). The fast tunable transmitter is an optical device that may be adjusted to transmit in different wavelengths. The fixed receiver is an optical device that always receives data using the same wavelength. While the exemplary embodiment is described with respect to TTFR nodes, the present invention is not so limited. One skilled in the art may extend the teachings herein to networks where each node has a fixed transmitter and tunable receiver (FTTR), or networks that incorporate nodes that have both tunable transmitters and tunable receivers (TTTR).

Generating constraints as may be employed for step 202 of FIG. 2 is now described.

Returning to FIG. 3, the fixed receiver of a node j, where $1 \leq j \leq N$, always receives data at an associated wavelength $\omega_j$. Thus, in order for node i transmit data to node j, node i tunes its transmitter to the wavelength $\omega_j$, and then transmits (e.g., packet or burst) data. A given wavelength is always associated with a specific receiving node, preventing contention for wavelengths between two different receiving nodes. Since node j is the only node listening to wavelength $\omega_j$, node j is the only node to receive this packet.

Propagation time between node i and node (i+1) is denoted as $\tau_i$ (using the notation: node (N+1)≡node 1). The propagation time $T_j$ from node 1 to node j is given in equation (1):

$$T_j = \sum_{k=1}^{j-1} \tau_k, \qquad (1)$$

and the total propagation time T in a ring is given in equation (2):

$$T = \sum_{i=1}^{N} \tau_i. \qquad (2)$$

The propagation time $\tau_{ij}$ from node i to node j is given in equation (3):

$$\tau_{ij} = T_j - T_i \bmod T. \qquad (3)$$

For convenience, the time axis is in discrete units, or time-slots, and each $\tau_i$ is a multiple of a time-slot, although in general the time axis may be continuous. A node can receive (or transmit, in FTTR nodes) at most one packet per time-slot. The nodes of the ring periodically schedule a given traffic, or rate, matrix $R=[R_{ij}]_{1 \leq i,j \leq N}$. This rate matrix R might be explicitly given to the node (e.g., in networks operating in accordance with a SONET standard), or rate matrix R might be periodically re-computed (e.g., with data traffic), where each re-computation period is significantly larger than the propagation and schedule times. The rate matrix R is admissible, or doubly sub-stochastic, so that a node does not need to transmit (or receive, in FTTR nodes) more than one packet per time-slot. If the rate matrix R is not admissible, preconditioning of the matrix might be employed to make the rate matrix R admissible. Thus, for any nodes i,j, the sum of the elements of the rate matrix is less than or equal to one, as given in equations (4) and (5):

$$\sum_{k=1}^{N} R_{ik} \leq 1, \text{ and} \qquad (4)$$

$$\sum_{k=1}^{N} R_{kj} \leq 1 \qquad (5)$$

In addition, the matrix R is rational, so the matrix R can be scheduled in a finite period.

The objective is to schedule the rate matrix R using a periodic schedule, where each of a set of transmission matrices is scheduled during the period of the schedule. The primary complexity for scheduling arises from inherent propagation delays. Before accounting for the complexity of propagation delay, the network is modeled for the case where all delays are null ($\tau_{ij}$=0 for all $1 \leq i,j \leq N$). In addition, the only constraints at each time-slot are that any node should transmit at most one packet, and any node should receive at most one packet. Therefore, a permutation matrix can be specified for each time-slot, where the permutation matrix is a 0-1 matrix with at most a single "1" value (element) per row and at most a single "1" value (element) per column. A constant multiplier is associated with the permutation matrix equivalent to the length of time the permutation matrix is scheduled for. The product of the constant multiplier and the permutation matrix forms a transmission matrix. The sum of the different transmission matrices over a frame period is sufficient to schedule the rate matrix R, and so the sum of the transmission matrices should be greater than or equal to the rate matrix R.

Given these constraints, the rate matrix R might be scheduled using a Birkhoff-von Neumann (BV) decomposition, which may be employed for step 203 of FIG. 2. In the BV decomposition of the rate matrix R, a given entry $R_{ij}$ is divided and spread ("striped") across several permutation matrices. Each of the permutation matrices is a 0-1 matrix with at most a single "1" value (element) per row and a single "1" value (element) per column.

The BV decomposition is accomplished in two steps using methods known in prior art, such as described in C. S. Chang, W. J. Chen and H. Y. Huang, "On Service Guarantees for input buffered crossbar switches: a capacity decomposition approach by Birkhoff and Von Neuman," IEEE IWQoS'99, pp. 235-244, Napa, Calif., 1999, which is incorporated herein in its entirety by reference. In the first step, the rate matrix is converted to a doubly stochastic matrix. Such conversion is described in, for example, J. von Neumann, "A certain zero-sum two-person game equivalent to the optimal assignment problem," *Contributions to the Theory of Games*, vol. 2, pp. 5-12, Princeton University Press, Princeton, N.J., 1953, which is incorporated herein in its entirety by reference. A doubly stochastic matrix is also a doubly sub-stochastic matrix, where both inequalities of equations (4) and (5) become equalities. In the second step, the doubly stochastic matrix is decomposed to a set of permutation matrixes and associated weights by solving a series of maximum bi-partite matching problems, such as described in, for example, Birkhoff, "Tres observaciones sobre el algebra lineal," *Universidad Nacional de Tucuman Revista*, Serie A, vol. 5, pp. 147-151, 1946, which is incorporated herein in its entirety by reference.

In the BV decomposition, if R is an admissible, rational rate matrix of common denominator F, then there exists an integer $K \leq (N^2-2N+2)$, a set $\phi=(\phi_k)_{1 \leq k \leq K}$ of positive rational numbers of denominator F, and a set of permutation matrices $(\sigma_k)_{1 \leq k \leq K}$, such that the relations of equations (6) and (7) are satisfied:

$$R \leq \sum_{k=1}^{K} \phi_k \sigma_k \text{ and} \qquad (6)$$

$$\sum_{k=1}^{K} \phi_k = 1 \qquad (7)$$

Since each permutation matrix is a 0-1 matrix with exactly one "1" per row and exactly one "1" per column, it is possible to schedule any permutation matrix at any time-slot without conflicts.

In addition, for the kth permutation matrix, $\phi_k$ is the ratio of a positive integer divided by the denominator F. The denominator F is termed the "frame period" and corresponds to the length of time over which the rate matrix R is scheduled. When traffic is scheduled over a number of time-slots where each time-slot has a period $T_{TS}$, the frame period F is equivalent to $F_R \cdot T_{HS}$, where $F_R$ is the number of time-slots in the frame period.

The equality of equation (7) specifies that, over a frame period of F (or $F_R$ time-slots), all permutation matrices $\sigma_k$ may be scheduled in turn during a time F$\phi$. Thus, $\sigma_1$ will first be scheduled for a time F$\phi_1$, $\sigma_2$ will first be scheduled for a time F$\phi_2$, ..., and finally $\sigma_K$ will first be scheduled for a time F$\phi_K$. During each frame period F, the rate matrix R is guaranteed to be scheduled.

Such BV decomposition is advantageously employed in transport networks operating in accordance with SONET (Synchronous Optical Network). When all traffic demands in the SONET network are based on an STS-1 granularity, the traffic demands are expressed as an integer matrix. The rate matrix R is the ratio of this integer matrix divided by $F_R$, where $F_R$ is the number of STS-1 circuits. For instance, for OC192 transmission rates, the period is 192 time-slots, yielding 192 different matrices. R thus equals the ratio of an integer matrix divided by 192, where all rows and columns of the integer matrix sum to at most F so that R is admissible.

Given the BV decomposition described above for a network with null delays, in accordance with exemplary embodiments of the present invention, the BV decomposition can be extended to schedules that account for propagation delays. The transmitter constraint is the same as the null-delay case in that a node can transmit at most one packet every time-slot, and so a schedule should have at most a single 1 on each row at each time-slot. However, the receiver constraint differs in that, since a receiver node can receive at most one packet per time-slot and packets sent by different transmitting nodes take different amounts of time to reach the receiver, the constraints between transmitting nodes span different transmitting schedules.

Thus, the constraints as may be employed for step 202 of FIG. 2 are mathematically formulated as follows. First, the schedule for a null-propagation-delay case is specified. Second, the schedule accounting for delay is specified. Third, the schedules for the null-delay case and for the accounting for delay case are related.

The schedule is periodic as a function of period F, the schedule is denoted by S, $0 \leq t \leq F$, and S is the schedule used at time-slot t. If t is discrete, in terms of unit time-slots, then t ranges over $0 \leq t \leq F_R - 1$. If all propagation times are null, the constraints may be expressed mathematically as in equations (8a), (8b), (8c) and (8'd):

$$\sum_{k=1}^{N} S_{ik}(t) \leq 1 \ \forall \ i, t \tag{8a}$$

$$\frac{1}{F} \sum_{t=0}^{F-1} S_{ij}(t) \geq R_{ij} \ \forall \ i, j \tag{8b}$$

$$S_{ij}(t) \in \{0, 1\} \ \forall \ i, j, t \tag{8c}$$

-continued $$\sum_{k=1}^{N} S_{kj}(t) \leq 1 \ \forall \ j, t \tag{8'd}$$

where $S_{ik}(t)$ is the schedule for traffic from node i to node k at time-slot t.

Equation (8a) imposes the constraint that each transmitter sends at most one packet per second. Equation (8b) imposes the constraint that the rate matrix R is satisfied. Equation (8c) imposes the constraint that partial packets (or "half-packets") cannot be transmitted. Equation (8'd) imposes the constraint that each receiver receives at most one packet per time-slot, corresponding to null propagation time (i.e., no transfer delay).

If propagation times are non-null, the general constraint accounting for propagation delays is given in equation (8d) instead of equation (8'd):

$$\sum_{k=1}^{N} S_{kj}((t - \tau_{kj}) \mod F) \leq 1 \ \forall \ j, t. \tag{8d}$$

As specified in equation (8d), each schedule depends on time, propagation delay, and frame period by adjusting the time t to $(t - \tau_{kj}) \mod F$. Since the time axis is modulo F, the schedule is periodic and each transmission matrix is periodically scheduled with period F. Thus, each schedule depends on the other schedules.

Given a specific network, the general mathematical formulation of equations (8a) through (8d) may be solved for a specific network characterized with a given configuration and propagation delay. Exemplary embodiments of the present invention are described for i) varying conditions of propagation delay in a ring network with a given rate matrix R, ii) propagation delay in a network having best-effort traffic, and iii) non-ring network configurations that include propagation delay and that may be modeled using ring constraints in accordance with the present invention.

Scheduling for Ring Networks with Given Rate Matrix

The following three exemplary cases describe determination of a schedule for specific networks, where the traffic is characterized with a given rate matrix R and the time-slot length may be varied. The first exemplary case describes a solution for a first specific network case in which propagation time is relatively small. The second exemplary case describes a solution for a second specific network case in which propagation time is relatively large. The third exemplary case describes a time-shifted algorithm and solution for a general network case.

In accordance with the first exemplary case, propagation time is very small, on the order of $\epsilon$, when compared to the scheduling period or when traffic is delay-insensitive. The theoretical throughput bound of such network is 100%, but never reaches the theoretical 100% throughput due to the non-zero value of $\epsilon$. For such network, the rate matrix R might be scheduled when the rate matrix R is strictly under-subscribed (i.e., each transmitter in TTFR networks or each receiver in FTTR networks has less demand for packet transfer than the capacity that is available). Thus, mathematically, there exists a value $\epsilon > 0$ such that, for each node i and each node j in $\{1, \ldots, N\}$, equations (9) and (10) are satisfied:

$$\sum_k R_{ik} \le 1 - \varepsilon \tag{9}$$

$$\sum_k R_{kj} \le 1 - \varepsilon. \tag{10}$$

The BV decomposition of R with null delay (using constraints of equations (8a) through (8'd)) results in several permutation matrices, each of which is a transmission schedule. Then, each of these permutation matrices is scheduled in turn for a relatively long time to clear all traffic from the ring before scheduling the next permutation matrix. Thus, for delay-insensitive traffic with rate matrix R and small propagation delay E, there exists a valid schedule (or set of transmission matrices) satisfying R such that each transmitter sends at most one packet per time-slot, each receiver receives at most one packet per time-slot, and there are no conflicts between packets. Consequently, R can be scheduled over a relatively long period of time.

The proof that R can be scheduled over a relatively long period of time for the first exemplary case is as follows: First, there exists a large integer frame period F and a large integer matrix A, such that equations (11)-(13) are true:

$$R \le \frac{1}{F} A, \tag{11}$$

$$N^2 T + \sum_k A_{ik} < F \ \forall \ i, \text{ and} \tag{12}$$

$$N^2 T + \sum_k A_{kj} < F \ \forall \ j. \tag{13}$$

If F is an integer greater than $(N^2T+N)/\varepsilon$, and $A_{ij}=\lceil F \cdot R_{ij} \rceil$ for each i,j, then equation (11) holds true. In addition, for each i,j:

$$\left(N^2 T + \sum_k A_{ik}\right) \le \left(N^2 T + \sum_k (FgR_{ik} + 1)\right) \le (N^2 T + F(1-\varepsilon) + N) < F,$$

and, thus, equation (12) holds true. Similarly, equation (13) holds true. BV decomposition can be applied to decompose A as a sum of at most $N^2$ permutation matrices.

Thus, for relatively small propagation delay, each permutation matrix is scheduled in turn using an inter-schedule time of T between each schedule (i.e., after scheduling one permutation matrix, a period of time T passes before the next permutation matrix is scheduled). Inside (during the period of) each scheduled transmission matrix, there is no conflict, since there is a single transmitter for each receiver. In addition, since T is the total propagation time in the ring, by the end of the inter-schedule time T, all packets sent according to the last used permutation matrix will have been received. Thus, this schedule of the permutation matrices satisfies R and all the conditions of equations (8a) through (8d).

In accordance with the second exemplary case, each time-slot might be made arbitrarily small or propagation delay is relatively long. First, the rate matrix R is decomposed according to the BV decomposition for the null delay case. Then, the schedule for the case accounting for delay is related to the schedule for the null delay case as follows: if it is possible to assign a time-slot value such that each propagation time $z_i$ is a multiple of the frame period, then equations (8d) and (8'd) are identical since $(t-\tau_{kj})$ modF=t modF=t, the BV decomposition satisfies equations (8a) through (8d), and the resulting schedule (i.e., schedule of permutation matrices) for R are valid.

Figure 4A:
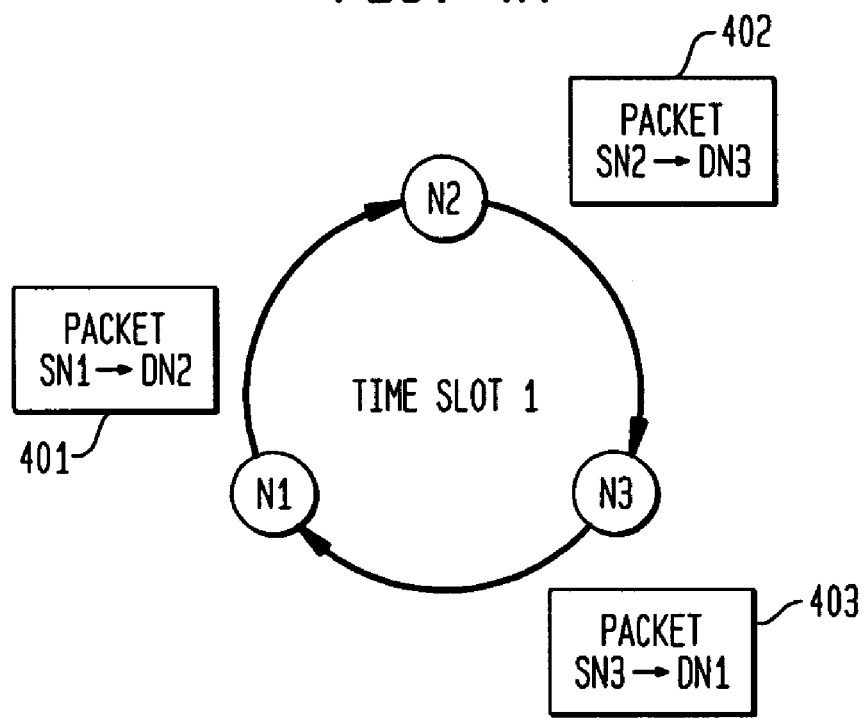
FIG. 4A shows a WDM ring network at a first scheduling time-slot and operating in accordance with an exemplary embodiment of the present invention for relatively long propagation delay.
Figure 4B:
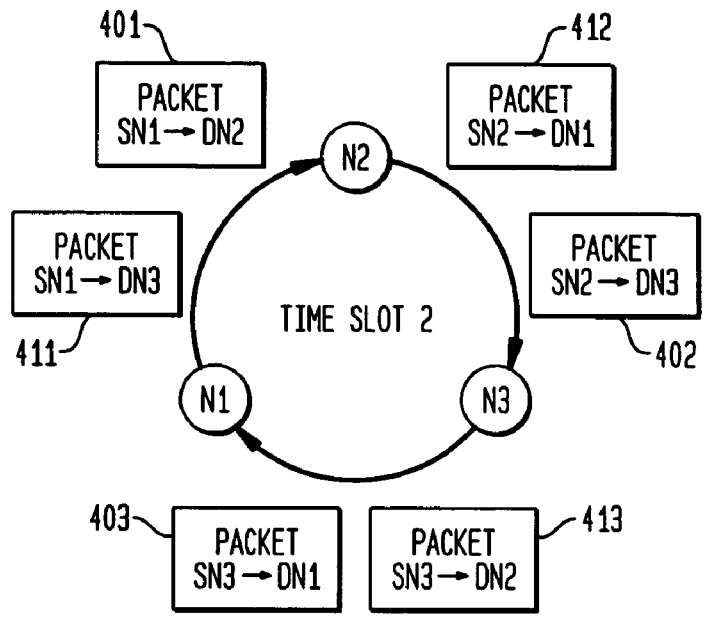
FIG. 4B shows the WDM ring network of FIG. 4A at a second time-slot.
Figure 4C:
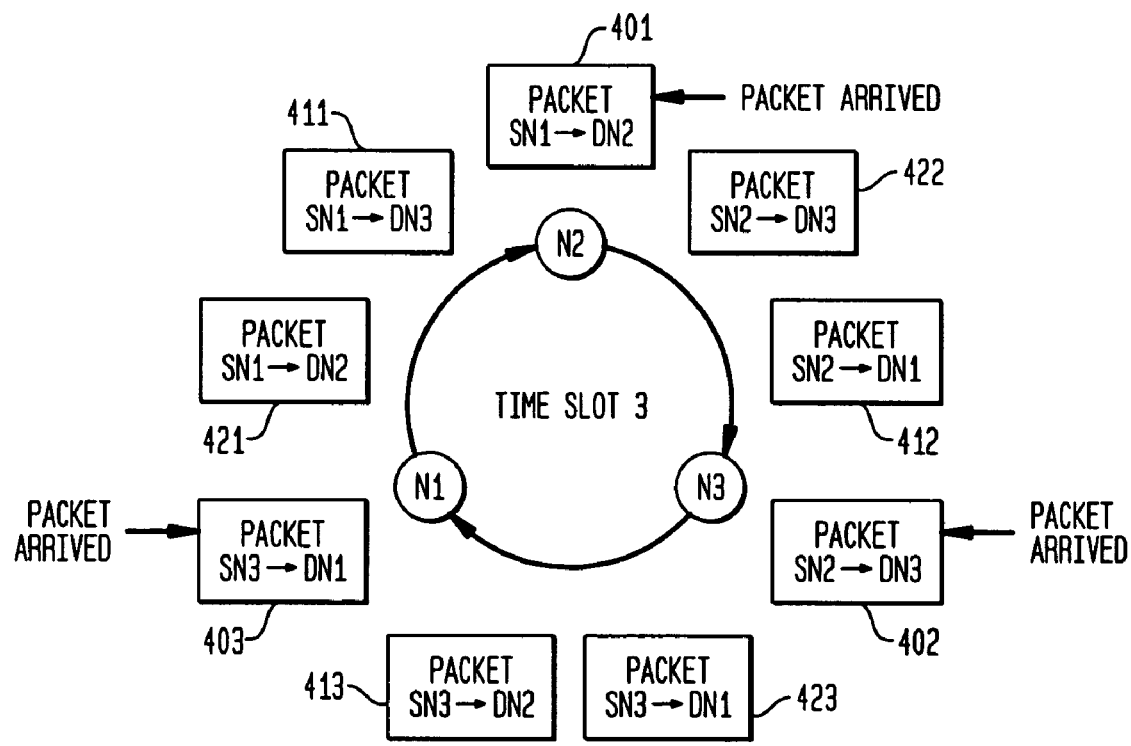
FIG. 4C shows contention at a third scheduling time-slot for the WDM ring network of FIG. 4A.

For this second exemplary case, all propagation times are multiples of the scheduling frame period F, and conflicts are avoided because a single frame does not span multiple nodes in the ring. FIGS. 4A, 4B, and 4C illustrate the operation of this second exemplary case for time-slots 1, 2, and 3, respectively, using the schedule of Table 1, propagation delay between each node is 1 μs, and the time-slot length is 0.5 μs.

In accordance with the third, or general, exemplary case, a general solution is determined for a valid schedule S (a set of permutation matrices $S_k$, k=1, 2, . . . , N) that 1) satisfies the rate matrix R and 2) removes the scheduling conflicts that arise from the propagation-time component of equation (8d) (i.e., the term $S_{kj}((t-\tau_{kj}) \mod F)$. Such schedule S may be generated by first generating a schedule S' defined as in equation (8'd), re-written below, that satisfies equations (8a), (8b), and (8c) (the null-delay case).

$$S' = \sum_{k=1}^{N} S'_{kj}(t) \le 1 \ \forall \ j, t \tag{8'd}$$

Then, schedule S is generated by determining a relation between schedule S' defined by equation (8'd) and schedule S defined by equation (8d) such that S necessarily satisfies equations (8a), (8b), (8c), and (8d). For the first and second exemplary cases, previously described, the solution generated the schedule by first setting $S_{kj}((t-\tau_{kj}) \mod F)=S_{kj}(t)$, and then using S=S'. For the general case, termed the Time-Shifted Scheduling (TSS) algorithm, a different method is employed. For the TSS algorithm, the frame period F is set to the total propagation time around the ring T (i.e., F=T), and no requirement is specified on the propagation times between individual nodes.

Since T is determined during, for example, ring initialization, and the value for F is the frame period, the time-slot length is determined by setting $F_R \cdot$(time-slot length) equal to T. The TSS algorithm employs a global clock (e.g., a clock provided by one of the network nodes, which for convenience herein is set as node 1). The TSS algorithm defines schedule S as equivalent to schedule S' when all nodes employ the same global clock that travels along the ring such that the relation given in equation (14) holds true:

$$S_{ij}(t)=S'_{ij}(t-\tau_{1i}), \tag{14}$$

According to equation (14), the schedule for node i at time t is based on the schedule transmission matrix that node 1 used at time $(t-\tau_{1i})$. Then, substituting equation (8'd) for equation (8d) and using the relation that S' is periodic of period F, equation (8d) might be written as in equation (15):

$$1 \ge \sum_{k=1}^{N} S_{kj}((t - \tau_{kj}) \mod F) = \sum_{k=1}^{N} S'_{kj}((t - \tau_{kj}) \mod F) - \tau_{1k}) \tag{15}$$

$$= \sum_{k=1}^{N} S'_{kj}((t - \tau_{1j}) \mod F)$$

$$= \sum_{k=1}^{N} S'_{kj}(t'),$$

-continued where $t' = (t - \tau_{1,j}) \bmod F)$

Given that F=T, the TSS algorithm results in a valid schedule S that satisfies the rate matrix R. Thus, the TSS algorithm introduces a synchronization between nodes by forcing node k to synchronize its transmission with the bursts arriving from node k-1. If node k-1 starts transmitting data to a destination at time t, then node k will start transmitting its data to some other destination at time t+$\tau_{k-1}$. When a round-trip period (T) is complete, node k transmits again to the same destination, and, because of frame periodicity, the corresponding wavelength will be available. The TSS algorithm may be extended to the case where the propagation delay around the ring is an integer multiple of the frame period.

Figure 5A:
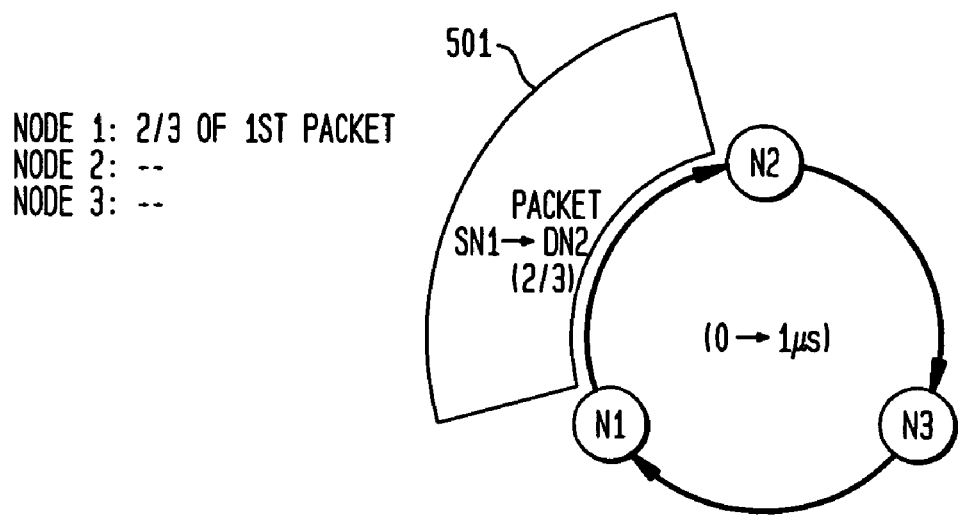
FIG. 5A shows a WDM ring network at a first scheduling time-slot for time-shifted scheduling (TSS) in accordance with an exemplary embodiment of the present invention accounting for propagation delay.
Figure 5B:
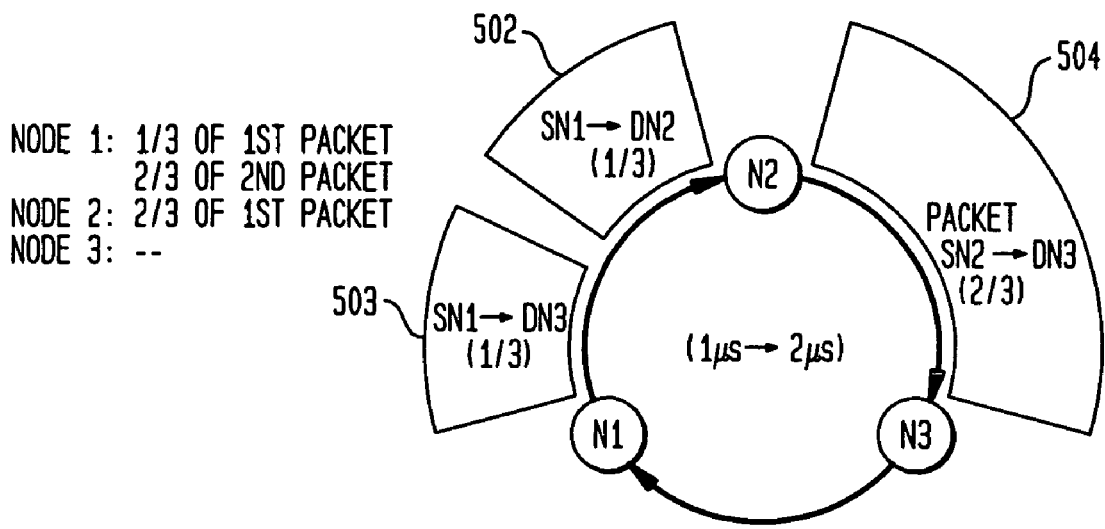
FIG. 5B shows the WDM ring network of FIG. 5A at a second time-slot for TSS.
Figure 5C:
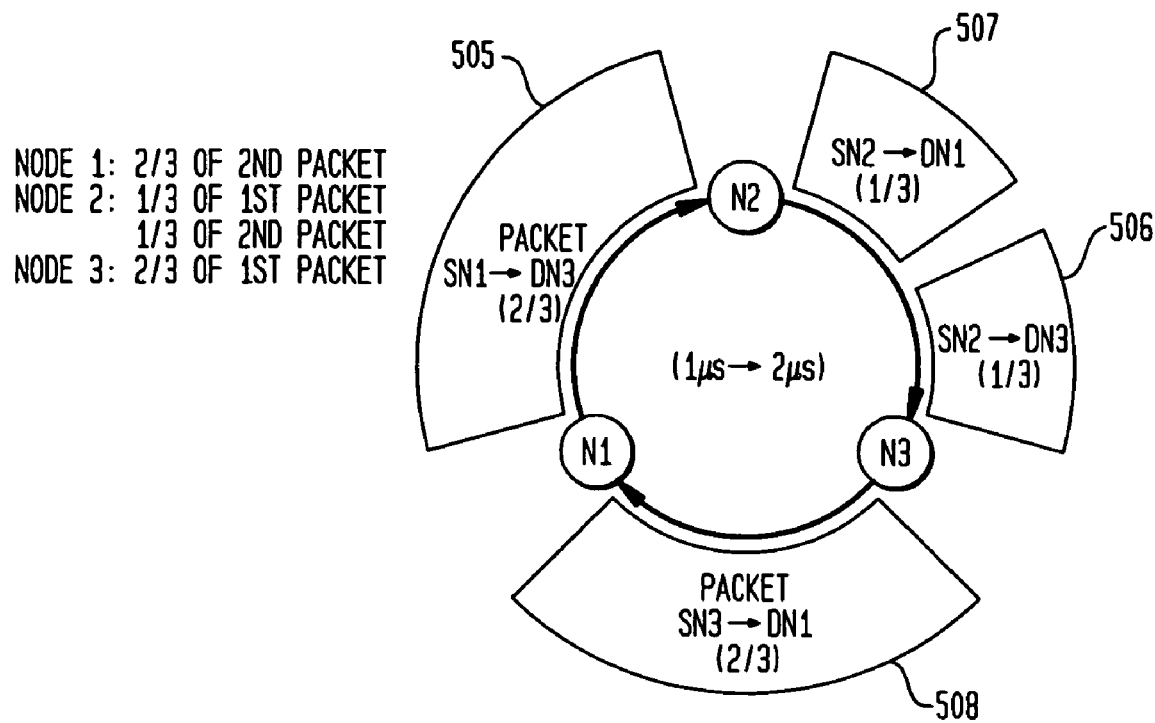
FIG. 5C shows the WDM ring network of FIG. 5A at a third time-slot for TSS.

FIGS. 5A, 5B, and 5C illustrate the operation of this third exemplary case for time-slots 1, 2, and 3, respectively. The example of FIGS. 5A, 5B, and 5C uses the schedule of Table 1, propagation delay between each node as 1 μs, the number of packets in a frame as 2, and the time-slot (packet) length as 1.5 μs. Since the period T is 3 μs, and the number FR of packets in a frame is 2, the packet length is set to 3/2=1.5 μs. Thus, in the three-node case, the schedule for a node alternates between sending to each other node with a duration of 1.5 μs for each schedule. Consequently, during 1.0 μs, two-thirds of a packet may be sent.

As shown in FIG. 5A, during the time interval 0.0 μs-1.0 μs, the first ⅔ of its first packet is sent from node N1 as burst 501 to node N2. In FIG. 5B, during the next time interval 1.0 μs-2.0 μs, node N1 sends the remaining ⅓ of its first packet as burst 502 to node N2, as well as the first ⅓ of its second packet as burst 503 to node N3. Node N2 sends the first ⅔ of its first packet as burst 504 to node N3. In FIG. 5C, during the third time interval 2.0 μs-3.0 μs, node N1 sends the first ⅔ of its second packet as burst 505 to node N3. Node N2 sends the last ⅓ of its first packet as burst 506 to node N3, as well as the first ⅓ of its second packet as burst 507 to node N1. Node N3 sends the first ⅔ of its first packet as burst 508 to node N1.

The TSS algorithm provides throughput of 100%, since it is possible to satisfy any admissible traffic matrix by finding a schedule S' using the BV decomposition. The only condition imposed by the TSS algorithm is that T=F. Thus, if T is known during ring initialization and F is known from the traffic rate matrix, then an appropriate time-slot length can be calculated. If F changes periodically, then the time-slot duration also changes periodically.

For traffic demands in the network and corresponding rate matrices that are defined as in the SONET hierarchy and are based on an STS-1 granularity, the traffic demand can be expressed as an integer matrix and the period of the schedule is no more than the number of STS-1 circuits for a given SONET bandwidth (i.e., for OC192 speeds, the period includes 192 different schedule transmission matrices). For these networks, the length of the schedule is always constant and known a priori.

During ring initialization, each node is instructed to transmit data to itself over the ring by tuning its laser to a predefined wavelength. Initially, the schedule does not require any coordinated control and is conflict-free. During this initial time interval, nodes receive packets from themselves, and can calculate the round-trip propagation delay. Assuming that the periodicity F of the schedule is determined using the SONET parameters during the BV decomposition of the rate matrix R, the master node can then fix the time-slot period $T_{TS}$ in the ring as $T_{TS}$=T/$F_R$, and then the scheduling operation begins. Further adjustments of the time-slot length can be periodically introduced in order to account for fiber-length variations due to temperature changes or other environmental reasons.

The global clock dictated by the single master node might be implemented using power measurements on the complete optical signal without requiring wavelength de-multiplexing on each node. This global clock synchronizes all node-scheduling operations. The ring network becomes relatively resistant to small differences in propagation delays, as long as a relatively accurate method is employed to maintain the global clock.

Scheduling for Ring Networks with Best-Effort Traffic

For the ring networks of the first, second, and third cases described previously, a traffic rate matrix R is given. The previously described TSS algorithm allowed for scheduling of any traffic rate matrix in a TTFR ring, as long as the traffic rate matrix is known a priori. Each element of the traffic rate matrix specifies the amount of bandwidth given to a particular connection. Other types of ring networks might not have a specified rate matrix, but instead are employed to transport "best-effort" traffic. Best-effort traffic, such as traditional Internet traffic without service guarantees or other forms of quality-of-service (QoS) provisioning, have connections that are established and tom down such that the traffic rates vary.

In accordance with a fourth exemplary case of the present invention, a ring network supporting best-effort traffic accounts for propagation delays with a "Load-Balanced Two-Stage (LBTS)" algorithm. The LBTS algorithm modifies the ring network architecture based on Load-Balanced Birkhoff-Von Neumann (LBBV) switching so as to adjust the traffic passing through a node to exhibit a uniform distribution. Once the traffic exhibits a uniform distribution, a traffic matrix R can be constructed for the ring network and a schedule derived accounting for propagation delay by using the TSS algorithm described above.

Load Balanced Birkhoff-Von Neumann (LBBV) switching is based on a three-stage switch (e.g., a space-memory-space switch) that modifies the traffic distribution of traffic input to the switch such that the traffic rate matrix may be derived for uniformly distributed traffic. Such LBBV switching is described in, for example, C. S. Chang, D. S. Lee and Y. S. Jou, "Load balanced Birkhoff-von Neumann switches, part I: one-stage buffering," *IEEE HPSR '01*, Dallas, May 2001, which is incorporated herein in its entirety by reference.

The first-stage crossbar randomly distributes incoming packets to one of a set of parallel memories in the second stage. Packets (or bursts) are then placed into virtual output queues in the second stage based on their final destinations (switch output ports). The third stage is a cross-connect that delivers packets to their final destinations.

The first-stage crossbar distributes the incoming load equally among all memories of the second stage so that the bandwidth demand between any memory in the second stage and any output port of the switch is also uniformly distributed. Distributing the load might occur by routing arriving packets uniformly across the memories, irrespective of their actual destinations, with a static round-robin schedule. Delivering the packets to the output ports of the switch might also occur by routing with a static round-robin schedule.

Figure 6:
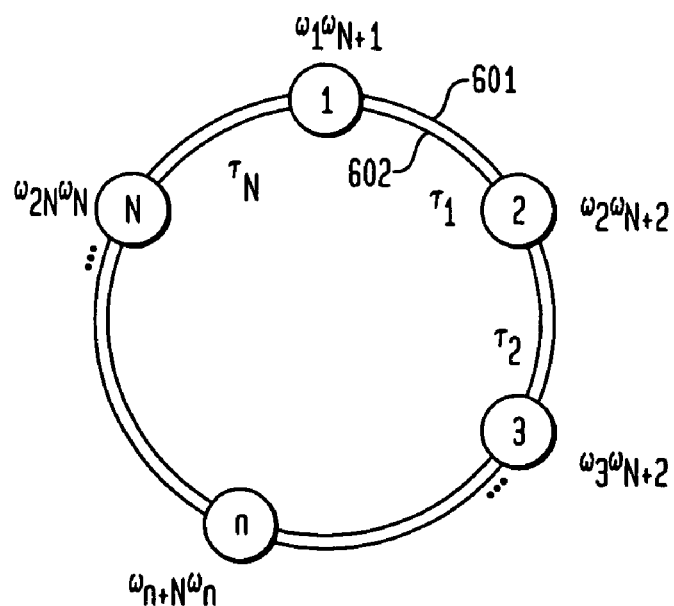
FIG. 6 shows load-balanced, Birkhoff-von Neumann switching for a ring network.

LBBV switching for a TFFR ring is shown in FIG. 6. The network includes two independent logical rings 601 and 602, where each of nodes 1 through N supports two sets of tunable transmitters and fixed receivers, one associated with each logical ring. For the ring of FIG. 6, one logical ring has associated wavelengths $\omega_1$ through $\omega_N$, and the second logical ring has associated wavelengths $\omega_{N+1}$ through $\omega_{2N}$. Each of nodes 1 through N receives packets for itself using two wavelengths. In a first logical ring, packets sent from a (source) node are distributed to one of the other nodes in the ring to adjust the traffic distribution. Packets are scheduled for distribution to destination nodes in the second logical ring.

Figure 7:
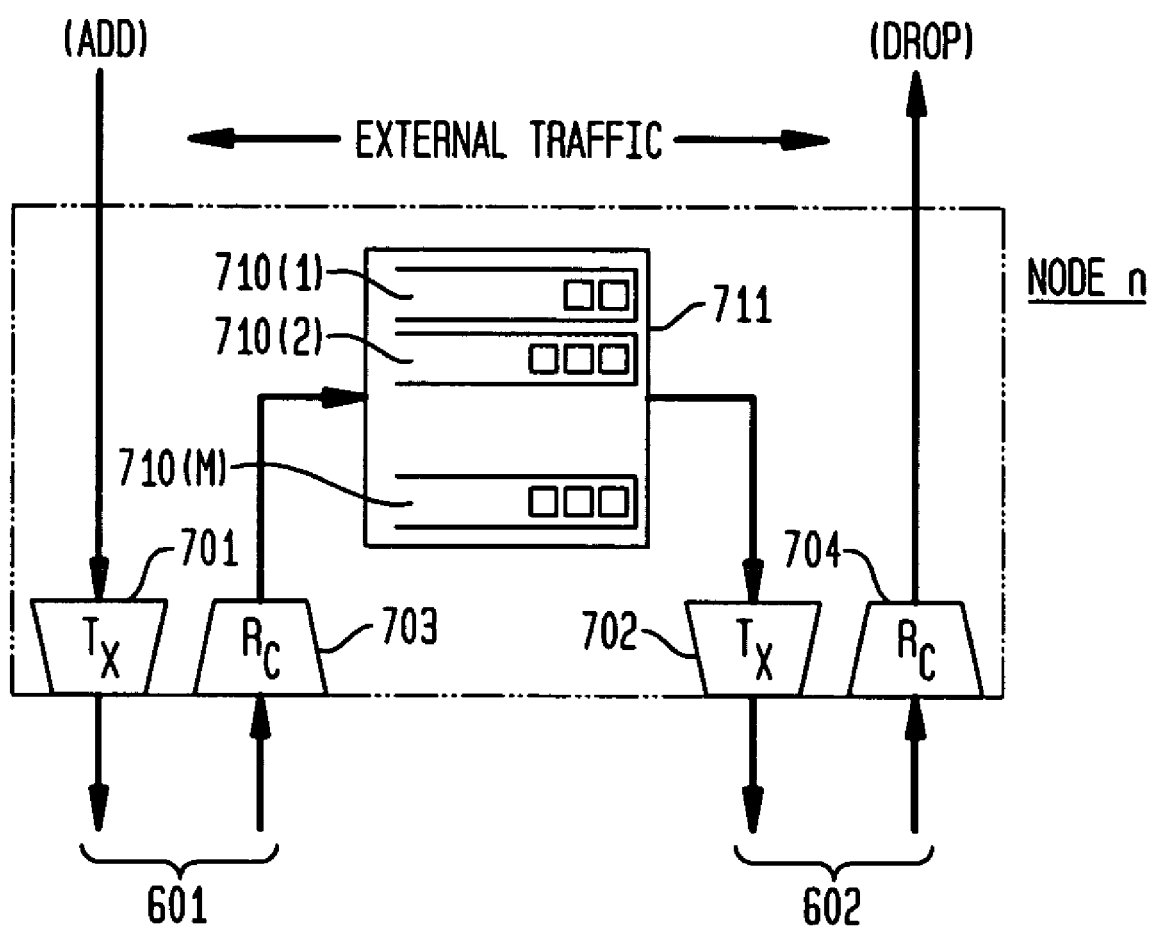
FIG. 7 shows an exemplary node n of FIG. 6.

FIG. 7 shows an exemplary node n of FIG. 6 with two tunable transmitters 701 and 702, and two fixed receivers 703 and 704. As shown in FIG. 7, external traffic to node n is received at transmitter 701 (e.g., add traffic) coupled to first logical ring 601 and provided to node n at receiver 704 (e.g., drop traffic) coupled to second logical ring 602. Packets from node n are distributed to node n+1 using transmitter 701 coupled to first logical ring 601.

Packets from node n−1 are distributed to node n using receiver 703 from first logical ring 601, and these packets are stored in buffers 710(1) through 710(M) of local memory 711. Packets might be routed to each of buffers 710(1) through 710(M) in accordance with, for example, a round-robin schedule. In second logical ring 602, packets from node n are routed to their final destinations through transmitter 702. Packets might be routed from each of buffers 710(1) through 710(M) to tunable transmitter 702 in accordance with, for example, a schedule determined with the TSS algorithm to account for propagation delays. LBBV switching for a TFFR ring utilizes twice the number of transmitters/receivers and the effective resource utilization is 50%. This TFFR ring transfers best-effort traffic without a separate control channel or MAC protocol.

Scheduling for Networks Including Propagation Delay

Figure 1A:
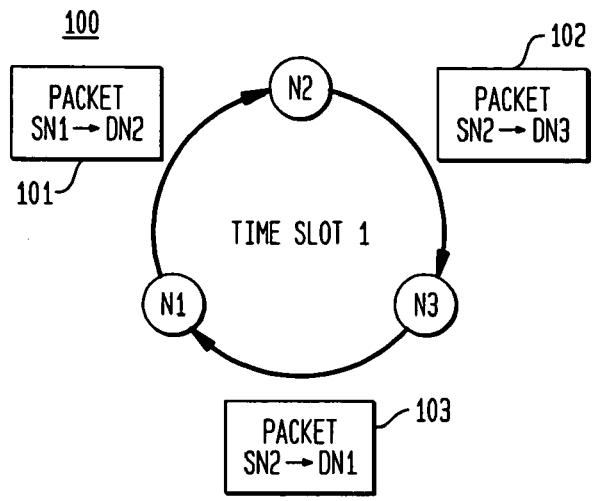
FIG. 1A shows a prior-art wavelength division multiplex (WDM) ring network at a first scheduling time-slot.
Figure 1B:
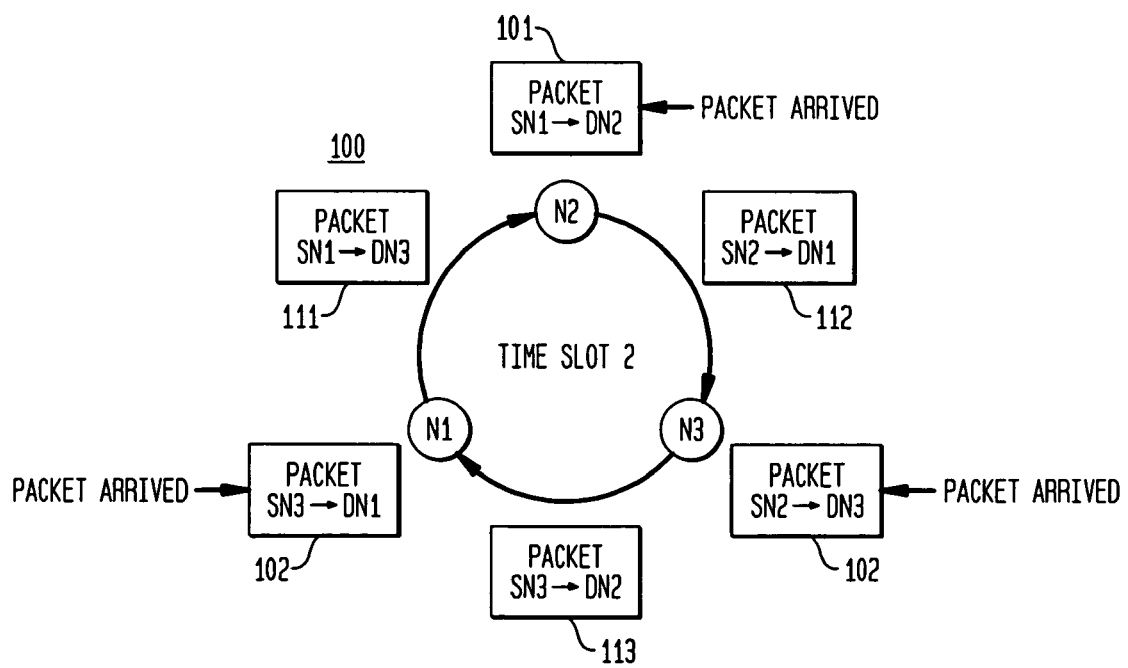
FIG. 1B shows the prior-art WDM ring network of FIG. 1A at a second time-slot.
Figure 1C:
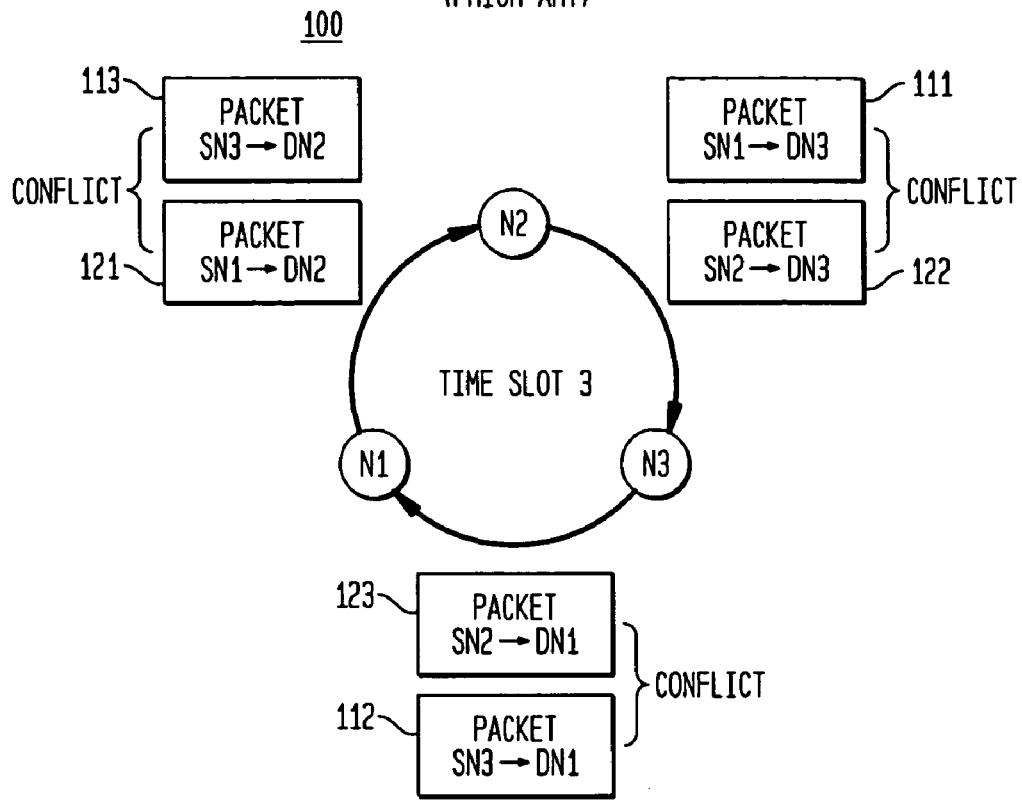
FIG. 1C shows contention at a third scheduling time-slot for the prior-art WDM ring network of FIG. 1A.

The TSS algorithm for the third exemplary case as applied to a WDM ring network might be generalized to scheduling using a Birkhoff-von Neumann decomposition with delays between nodes for other types of networks. Consequently, the network might be modeled using a bipartite network graph accounting for delays (for example, at step 201 of FIG. 1). The TSS algorithm might be modified for bipartite graphs with delays as follows.

A bipartite graph is employed to model a given network of nodes and links. Any node i sends packets to node j using a specific wavelength $\omega_j$. Packets arrive at node j after a delay of $\tau_{ij}$. Input vertices of a bipartite graph of the network correspond to the transmitting nodes, output vertices correspond to the receiving nodes, and nodes i and j are connected using a delay $\tau_{ij}$. For the bipartite graph, each delay is separable so there exists two sequences of delays u and v such that equation (16) is satisfied:

$$\tau_{ij} = u_i + v_j \; \forall i,j \tag{16}$$

In order for node i to send packets to node j, node i employs a delay $u_i$ to send packets to a center point (e.g., a processing point), and a delay $v_j$ occurs for the packets to reach node j from the center.

Finally, the delays are defined as separable modulo $F_{BG}$, where $F_{BG}$ is a positive integer, such that equation (17) is satisfied:

$$\tau_{ij} = u_i + v_j \bmod F_{BG} \; \forall i,j \tag{17}$$

and $\tau_{ii} = 0 \bmod F_{BG}$ for any node i and $u_i = -v_i \bmod F_{BG}$.

Using the TSS algorithm, the Birkhoff-von Neumann decomposition of frame period $F_{BG}$ is generalized to all bipartite graphs with separable delays modulo $F_{BG}$. The schedule S' is defined as a schedule resulting from the Birkhoff-von Neumann decomposition (S' is periodic of period $F_{BG}$), and define schedule $S_{ij}(t)$ for all i, j, t as in equation (18):

$$S_{ij}(t) = S'_{ij}(t - v_j). \tag{18}$$

Then, equation (8d) may be rewritten as in equation (19):

$$1 \geq \sum_{k=1}^{N} S_{kj}((t-\tau_{kj}) \bmod F) = \sum_{k=1}^{N} S'_{kj}(((t - [u_k - v_j]) \bmod F) - v_k) \tag{19}$$

$$= \sum_{k=1}^{N} S'_{kj}((t - v_j) \bmod F)$$

$$= \sum_{k=1}^{N} S'_{kj}(t'),$$

where $t' = (t - v_j) \bmod F$

Similarly, all the other scheduling conditions of equations (8a), 8(b), and (8c) are satisfied. For example, the following networks might be modeled using a bipartite graph, and the modified TSS algorithm might be employed to generate schedules accounting for delay.

The Birkhoff-von Neumann decomposition might be used in Multi-Rack Packet Switches in order to determine the periodic configuration of the switch fabric, for instance, an AWGR (arrayed wavelength grating router) or a crossbar. The distance from the linecard to the switch fabric becomes significant when compared to the time-slot duration. For instance, assuming a maximum inter-rack optical-fiber distance of 100 meters, a packet sent from a linecard, crossing the AWGR, and sent back to the linecard, takes a maximum round-trip-time of $T=(2)(100)(5)=1000$ ns. At the same time, at 40 Gbps, a 64-byte packet lasts $(64)(8)/((40)(10^9))=12.8$ ns. While the time-slot duration is 12.8 ns, some packets can be extremely close to the AWGR and exhibit a negligible propagation time, while other packets can take up to 1000 ns round-trip-time.

The Birkhoff-von Neumann decomposition can be used in a TTFR configuration when using a star coupler. As in the example of the ring, each node has an associated wavelength (implemented either in optics or in wireless communications). The propagation delays associated with the distances between the nodes can then be accounted for. The star-coupler configuration might also be used to model the core of a network implementing a full mesh architecture between the nodes, with the constraint that each node sends and receives at most one packet per time-slot.

The TTFR might be generalized to a network mesh configuration, which would be a network model including rings, star couplers, and full meshes. Thus, each node i is associated with its wavelength $\omega_i$. Between any two nodes, there is a fixed path in the network, e.g., computed using the shortest-path-first algorithm. The bipartite graph might also apply to the general case of the network mesh when the following condition is satisfied: if node i sends traffic to node j going through node k, and node k also sends traffic to j, then the delay between node k and node j is the same for the packets in transit from node i and as for those from node k. This condition comes from the only possible conflicts that either occur at the transmitting node with two packet transmissions or at the receiving node with two packet receptions. This condition is always satisfied using the shortest-path-first algorithm, but might not be true with load-balancing algorithms that adopt different paths for different flows.

For application to general networks modeled with bipartite graphs and accounting for delay, the Birkhoff-von Neumann decomposition of frame period $F_{BG}$ might be applied to bipartite graphs with separable delays modulo $F_{BG}$. Consequently, the following assertions are equivalent:

(i) Any admissible matrix R such that a (minimal) Birkhoff-von Neumann decomposition of R results in a frame period of F can be scheduled.

(ii) $\tau_{ij} = \tau_{i1} + \tau_{1j} - \tau_{11} \mod F$ (iii) There exists u, v such that $\tau_{ij} = u_i + v_j \mod F \; \forall i, j$ (i.e., the graph has separable delays modulo F).

In a bipartite delay graph as defined above, any admissible matrix R can be scheduled if and only if the graph has separable delays (i.e., there exists u, v such that $\tau_{ij} = u_i + v_j$, where this the total delay between two nodes i and j). Separable delays are such that, for example, if three nodes 1, 2, 3, have a delay between nodes 1 and 2 as $\tau_{13} = u_1 + v_3$, then the delay between nodes 2 and 3 can be expressed as $T_{23} = u_2 + v_3$. This relation holds for every pair of nodes, and one of the delay components is always the same for a given ingress node and the other is always the same for a given egress node.

For some networks, the resulting network model, or graph, might not include separable delays. For a general bipartite graph with non-separable delays, it is not necessarily possible to schedule all possible rate matrices R in this graph. However, this general bipartite graph with non-separable delays might be modified such that any rate matrix R can be scheduled. The modification transforms the non-separable delays into separable delays.

To transform a general bipartite graph with non-separable delays into one with separable delays, specific delays can be added for each connection between two nodes i and j. For example, the transmitter of each node i might be coupled to one or more of the following devices: i) a (1×N) AWG (arrayed wavelength grating) passive optical device that splits the incoming packets to different fibers according to their wavelengths; ii) for each fiber associated to a specific node j and its wavelength $\omega_j$, a delay line of delay $\delta_{ij}$ that adds a delay of $\delta_{ij}$ to each packet; iii) an (N×1) AWG that combines again the different wavelengths into a single WDM fiber; and iv) a (2×1) star coupler that will merge this WDM fiber with the WDM fiber carrying the connections transiting from the other nodes through node i.

Using the additional delay lines $\delta_{ij}$ modifies the non-separable delays $\tau_{ij}$ into separable delays $\hat{\tau}_{ij}$, while desirably minimizing the amount of delay added, as given in equation (20):

$$\min_{\delta}\left(\sum_{i,j}\delta_{ij}\right), \text{such that:} \begin{cases} \text{(i)} & \hat{\tau}_{ij} = \tau_{ij} + \delta_{ij} \quad \forall \, i, j \\ \text{(ii)} & \hat{\tau}_{ij} = u_i + v_j \quad \forall \, i, j \\ \text{(iii)} & \delta_{ij} \geq 0 \quad \forall \, i, j \end{cases} \quad (20)$$

The objective function of equation (20) minimizes the sum of all delay lines for all connections. Condition (i) states that the delays $\hat{\tau}_{ij}$ in the new system are equal to the delays in the old system, augmented by the new delay lines. Condition (ii) states that the new system has separable delays. Condition (iii) states that the added delay lines cannot be negative valued. Equation (20) might be solved as follows. Equation (20) is rewritten as the minimization of equation (21):

$$\sum_{i,j}\delta_{ij} = \sum_{i,j}(\hat{\tau}_{ij} - \tau_{ij}) = \sum_{i,j}(u_i - v_j - \tau_{ij}). \quad (21)$$

Since the non-separable delays $\tau_{ij}$ are fixed, the minimization of equation (21) is rewritten as the minimization of equation (22):

$$\sum_{i,j}(u_i + v_j) = N\left(\sum_i u_i + \sum_j v_j\right). \quad (22)$$

Using equation (22), the three conditions from the optimization problem of equation (20) are combined into the following equivalent objective function of equation (23):

$$\min_{u,v}\left[N\left(\sum_i u_i + \sum_j v_j\right)\right], \text{such that:} \; u_i + v_j \geq \tau_{ij} \; \forall \, i, j. \quad (23)$$

Equation (23) finds the smallest separable delays that are still larger than each of the current delays. Equation (23) is the dual of a maximum weight matching problem in which the total minimum amount of delay lines needed for a-separable extension of a graph with non-separable delays is given in equation (24):

$$NW_{MWM} - \sum_{i,j}\tau_{ij}, \quad (24)$$

where $W_{MWM}$ is the weight of a Maximum Weight Match in the delay matrix $\tau$. Maximum Weight Matching is defined with reference to bi-partite graphs. A bi-partite graph consists of two sets of nodes, such that every edge in the graph connects a node from one set to a node from the other set, and there is no edge in the graph that connects nodes that belong in the same set. If edges in the graph have weights associated with them, the maximum weight match is defined as the sub-set of edges with the maximum total weight, such that no node is connected to more than one other node. Such technique is described in, for example, Tarjan, R. E., "Data Structures and Network Algorithms," *Society for Industrial and Applied Mathematics*, Pennsylvania, November 1983, which is incorporated herein by reference.

Scheduling with delayed graphs in accordance with one or more embodiments of the present invention may provide for the following advantages. A WDM packet switched optical ring network can achieve throughput asymptotically close to 100% irrespective of propagation delays. The WDM packet-switched optical ring network can achieve 100% throughput if propagation delays are relatively long and packets can be made arbitrarily small. A WDM-burst ring can achieve 100% throughput for any admissible traffic demand (i.e., no receiver or transmitter is more than 100% utilized), for medium-range propagation delays using the TSS algorithm. The WDM burst ring connecting N nodes can transport arbitrary best-effort traffic with 100% throughput if 2N wavelengths are available. The methods for ring network scheduling can be expanded to general network cases by modifying the TSS algorithm for network cases where a set of nodes communicates over a non-blocking interconnect but propagation delays between nodes are relatively large and variable. These methods for general-network cases cover a wide range of applications, such as multi-shelf switches/routers and/or all-optical networks.

The present invention may be embodied in a processor, such as a network controller or computer, and the processor may be coupled to a network or network database to receive network topology, provisioning, and capacity information used by the methods as described herein. In addition, the present invention may be employed for either wired, wireless, optical, or non-optical networks, and may be employed for either synchronous or asynchronous networks.

As would be apparent to one skilled in the art, the various functions of the scheduler may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

We claim:

1. A method of generating a schedule for two or more nodes of a network, the method comprising the steps of:
   (a) generating a network graph accounting for delay between each node of the network;
   (b) generating a set of network constraints for the network graph, one or more of the network constraints based on the schedule accounting for each delay; and
   (c) decomposing in accordance with a Birkhoff-Von Neumann decomposition, into a set of transmission matrices, a traffic matrix for the network graph based on the set of network constraints, the set of transmission matrices representing the schedule over a frame period, wherein step (c) decomposes the traffic matrix R in accordance with the Birkhoff-Von Neumann decomposition defined as:

$$R \leq \sum_{k=1}^{K} \phi_k \sigma_k, \text{ with}$$

-continued
$$\sum_{k=1}^{K} \phi_k = 1 \text{ and}$$

wherein the set $(\phi_k)_{0 \leq k \leq K}$ is a set of positive rational numbers of denominator F and $(\sigma_k)_{0 \leq k \leq K}$ is a set of permutation matrices.

2. The method of claim 1, further comprising the step of (d) scheduling each of the set of transmission matrices over the frame period.

3. The method claim 2, wherein, for step (c), traffic of the traffic matrix is delay insensitive, step (c) decomposes the traffic matrix for the set of constraints not accounting for delay, and the frame period includes an inter-schedule time of T, where the inter-schedule time is the time between scheduling each of the set of transmission matrices and T is the total propagation time through the network.

4. The method of claim 2, wherein step (c) decomposes the traffic matrix for the set of constraints not accounting for delay, and step (c) further comprises the step of adjusting a time-slot of the framing period, the framing period being equivalent to a multiple of the time-slot, such that each delay is a multiple of the frame period.

5. The method of claim 2, wherein, for step (b) the set of constraints of a set S of transmission matrices are:

$$\sum_{k=1}^{N} S_{ik}(t) \leq 1 \ \forall \, i, t$$

$$\frac{1}{F}\sum_{t=0}^{F-1} S_{ij}(t) \geq R_{ij} \ \forall \, i, j$$

$$S_{ij}(t) \in \{0, 1\} \ \forall \, i, j, t$$

$$\sum_{k=1}^{N} S_{kj}((t - \tau_{kj}) \bmod F) \leq 1 \ \forall \, j, t,$$

where i,j are the ith and jth nodes of the network, F is the frame period, t is a time unit, $\tau_{kj}$ is a delay between node k and node j, and N is a number of nodes in the network, and $R_{ij}$ is an entry corresponding to nodes i,j in a traffic matrix R.

6. The method of claim 5, wherein, for step (c), the frame period F is set to the total propagation time of the network, the schedule of each node is synchronized to a global clock, step (c) decomposes the rate matrix in accordance with the set of constraints not accounting for each delay $\tau_{kj}$ between nodes k and j for time t=t' and t' is time shifted by $(t-\tau_{kj}) \bmod F \ \forall j, t$.

7. The method of claim 5, wherein, for step (a), each delay $\tau_{ij}$ is separable into sub-delay sets u and v such that $\tau_{ij} = u_i + v_j \bmod F \ \forall i,j$.

8. The method of claim 5, wherein, for step (a), one or more of the delays $\tau_{ij}$ are non-separable, step (a) further comprises the step of adding, to one or more of the non-separable delays, an additional delay $\delta_{ij}$ such that the resulting network graph includes separable delays $\hat{\tau}_{i,j}$:

$$\begin{cases} \text{(i)} & \hat{\tau}_{ij} = \tau_{ij} + \delta_{ij} \ \forall \, i, j \\ \text{(ii)} & \hat{\tau}_{ij} = u_i + v_j \ \forall \, i, j \\ \text{(iii)} & \delta_{ij} \geq 0 \ \forall \, i, j \end{cases}.$$

9. The method of claim 8, further comprising the step of evaluating an objective function:

$$\min_{\delta}\left(\sum_{i,j} \delta_{ij}\right).$$

10. The method of claim 1, wherein, for step (b), one of the network constraints sets the frame period to a total delay through the network.

11. The method of claim 10, further comprising the steps of providing, by one of the two or more nodes of the network, a global clock and synchronizing the schedule of each node to the global clock.

12. The method of claim 1, wherein, for step (a), the network is a ring network of nodes interconnected by links in a ring configuration, the ring configuration having first and second logical rings coupled to corresponding first and second transmitter/receiver pairs.

13. The method hwenhen of claim 12, further comprising the steps of forming the traffic matrix for traffic of the second logical ring, the traffic of the second logical ring formed by load balancing the traffic of the traffic matrix between the first and second logical rings.

14. The method of claim 13, wherein load balancing of the traffic includes the steps of uniformly distributing packets received at a node in the first logical ring to one or more buffers of the node, and transferring packets of the buffers to the second logical ring.

15. The method of claim 1, wherein the method is implemented in a processor of a network controller coupled to the two or more nodes.

16. The method of claim 1, wherein, for step (a), the network is a ring network of nodes interconnected by links in a ring configuration.

17. The method of claim 16, wherein, for step (a) the ring is either a wavelength division multiplex ring, and each delay represents a propagation delay of a wavelength of each link.

18. A network of nodes interconnected by links including a processor comprising:
first means for generating a network graph accounting for delay between each node of the network;
second means for generating a set of network constraints for the network graph, one or more of the network constraints based on a schedule accounting for each delay; and
third means for decomposing in accordance with a Birkhoff-Von Neumann decomposition, into a set of transmission matrices, a traffic matrix R for the network graph based on the set of network constraints, the set of transmission matrices representing the schedule over a frame period,
wherein the traffic matrix R in accordance with the Birkhoff-Von Neumann decomposition is defined as:

$$R \leq \sum_{k=1}^{K} \phi_k \sigma_k, \text{ with}$$

$$\sum_{k=1}^{K} \phi_k = 1 \text{ and}$$

wherein the set $(\phi_k)_{0 \leq k \leq K}$ is a set of positive rational numbers of denominator F and $(\sigma_k)_{0 \leq k \leq K}$ is a set of permutation matrices.

19. A computer-readable medium having stored thereon a plurality of instructions, the plurality of instructions including instructions which, when executed by a processor, cause the processor to implement a method for generating a schedule for two or more nodes of a network, the method comprising the steps of:
(a) generating a network graph accounting for delay between each node of the network;
(b) generating a set of network constraints for the network graph, one or more of the network constraints based on the schedule accounting for each delay; and
(c) decomposing in accordance with a Birkhoff-Von Neumann decomposition, into a set of transmission matrices, a traffic matrix for the network graph based on the set of network constraints, the set of transmission matrices representing the schedule over a frame period, wherein step (c) decomposes the traffic matrix R in accordance with the Birkhoff-Von Neumann decomposition defined as:

$$R \leq \sum_{k=1}^{K} \phi_k \sigma_k, \text{ with}$$

$$\sum_{k=1}^{K} \phi_k = 1 \text{ and}$$

wherein the set $(\phi_k)_{0 \leq k \leq K}$ is a set of positive rational numbers of denominator F and $(\sigma_k)_{0 \leq k \leq K}$ is a set of permutation matrices.

20. A method of generating a schedule for two or more nodes of a network, the method comprising the steps of:
(a) generating a network graph accounting for delay between each node of the network;
(b) generating a set of network constraints for the network graph, one or more of the network constraints based on the schedule accounting for each delay, wherein the set of constraints of a set S of transmission matrices are:

$$\sum_{k=1}^{N} S_{ik}(t) \leq 1 \; \forall \, i, t$$

$$\frac{1}{F} \sum_{t=0}^{F-1} S_{ij}(t) \geq R_{ij} \; \forall \, i, j$$

$$S_{ij}(t) \in \{0, 1\} \; \forall \, i, j, t$$

$$\sum_{k=1}^{N} S_{kj}((t - \tau_{kj}) \bmod F) \leq 1 \; \forall \, j, t,$$

where i,j are the ith and jth nodes of the network, F is the frame period, t is a time unit $\tau_{kj}$ is a delay between node k and node j, and N is a number of nodes in the network, and $R_{ij}$ is an entry corresponding to nodes i,j in a traffic matrix R;
(c) decomposing, into a set of transmission matrices, a traffic matrix for the network graph based on the set of network constraints, the set of transmission matrices representing the schedule over a frame period; and
(d) scheduling each of the set of transmission matrices over the frame period.

21. The method of claim 20, wherein, for step (c), traffic of the traffic matrix is delay insensitive, step (c) decomposes the traffic matrix for the set of constraints not accounting for delay, and the frame period includes an inter-schedule time of T, where the inter-schedule time is the time between scheduling each of the set of transmission matrices and T is the total propagation time through the network.

22. The method of claim 20, wherein step (c) decomposes the traffic matrix for the set of constraints not accounting for delay, and step (c) further comprises the step of adjusting a time-slot of the framing period, the framing period being equivalent to a multiple of the time-slot, such that each delay is a multiple of the frame period.

23. The method of claim 20, wherein, for step (c), the frame period F is set to the total propagation time of the network, the schedule of each node is synchronized to a global clock, step (c) decomposes the rate matrix in accordance with the set of constraints not accounting for each delay $\tau_{kj}$ between nodes k and j for time t=t', and t' is time shifted by $(t-\tau_{kj}) \mod F \; \forall j, t$.

24. The method of claim 20 wherein, for step (a), each delay $\tau_{ij}$ is separable into sub-delay sets u and v such that $\tau_{ij}=u_i+v_j \mod F \; \forall i,j$.

25. The method of claim 20, wherein, for step (a), one or more of the delays $\tau_{ij}$ are non-separable, step (a) further comprises the step of adding, to one or more of the non-separable delays, an additional delay $\delta_{ij}$ such that the resulting network graph includes separable delays $\hat{\tau}_{ij}$:

$$\begin{cases} (i) & \hat{\tau}_{ij} = \tau_{ij} + \delta_{ij} & \forall i, j \\ (ii) & \hat{\tau}_{ij} = u_i + v_j & \forall i, j \\ (iii) & \delta_{ij} \geq 0 & \forall i, j \end{cases}$$

26. The method of claim 25, further comprising the step of evaluating an objective function:

$$\min_{\delta} \left( \sum_{i,j} \delta_{ij} \right).$$

27. The method of claim 20, wherein step (c) decomposes the traffic matrix in accordance with a Birkhoff-Von Neumann decomposition.

28. The method of claim 27, wherein step (c) decomposes the traffic matrix R in accordance with the Birkhoff-Von Neumann decomposition defined as:

$$R \leq \sum_{k=1}^{K} \phi_k \sigma_k, \text{ with}$$

$$\sum_{k=1}^{K} \phi_k = 1 \text{ and}$$

wherein the set $(\phi_k)_{0 \leq k \leq K}$ is a set of positive rational numbers of denominator F and $(\pi_k)_{0 \leq k \leq K}$ is a set of permutation matrices.

29. The method of claim 20, wherein, for step (b), one of the network constraints sets the frame period to a total delay through the network.

30. The method of claim 29, further comprising the steps of providing, by one of the two or more nodes of the network, a global clock and synchronizing the schedule of each node to the global clock.

31. The method of claim 20, wherein, for step (a), the network is a ring network of nodes interconnected by links in a ring configuration, the ring configuration having first and second logical rings coupled to corresponding first and second transmitter/receiver pairs.

32. The method of claim 31, further comprising the steps of forming the traffic matrix for traffic of the second logical ring, the traffic of the second logical ring formed by load balancing the traffic of the traffic matrix between the first and second logical rings.

33. The method of claim 32, wherein load balancing of the traffic includes the steps of uniformly distributing packets received at a node in the first logical ring to one or more buffers of the node, and transferring packets of the buffers to the second logical ring.

34. The method of claim 20, wherein the method is implemented in a processor of a network controller coupled to the two or more nodes.

35. The method of claim 20, wherein, for step (a), the network is a ring network of nodes interconnected by links in a ring configuration.

36. The method of claim 35, wherein, for step (a) the ring is either a wavelength division multiplex ring, and each delay represents a propagation delay of a wavelength of each link.

37. A network of nodes interconnected by links including a processor comprising:
first means for generating a network graph accounting for delay between each node of the network;
second means for generating a set of network constraints for the network graph, one or more of the network constraints based on a schedule accounting for each delay, wherein the set of constraints of a set S of transmission matrices are:

$$\sum_{k=1}^{N} S_{ik}(t) \leq 1 \; \forall i, t$$

$$\frac{1}{F} \sum_{t=0}^{F-1} S_{ij}(t) \geq R_{ij} \; \forall i, j$$

$$S_{ij}(t) \in \{0, 1\} \; \forall i, j, t$$

$$\sum_{k=1}^{N} S_{kj}((t - \tau_{kj}) \mod F) \leq 1 \; \forall j, t,$$

where i,j are the ith and jth nodes of the network, F is the frame period, t is a time unit, $\tau_{kj}$ is a delay between node k and node j, and N is a number of nodes in the network, and $R_{ij}$ is an entry corresponding to nodes i,j in a traffic matrix R; and
third means for decomposing, into a set of transmission matrices, a traffic matrix for the network graph based on the set of network constraints, the set of transmission matrices representing the schedule over a frame period.

38. A computer-readable medium having stored thereon a plurality of instructions, the plurality of instructions including instructions which, when executed by a processor, cause the processor to implement a method for generating a schedule for two or more nodes of a network, the method comprising the steps of:
(a) generating a network graph accounting for delay between each node of the network;
(b) generating a set of network constraints for the network graph, one or more of the network constraints based on the schedule accounting for each delay, wherein the set of constraints of a set S of transmission matrices are:

$$\sum_{k=1}^{N} S_{ik}(t) \le 1 \ \forall \ i, t$$

$$\frac{1}{F}\sum_{t=0}^{F-1} S_{ij}(t) \ge R_{ij} \ \forall \ i, j$$

$$S_{ij}(t) \in \{0, 1\} \ \forall \ i, j, t$$

$$\sum_{k=1}^{N} S_{kj}((t - \tau_{kj}) \bmod F) \le 1 \ \forall \ j, t,$$

where i,j are the ith and jth nodes of the network, F is the frame period, t is a time unit, $\tau_{kj}$ is a delay between node k and node j, and N is a number of nodes in the network, and $R_{ij}$ is an entry corresponding to nodes i,j in a traffic matrix R; and (c) decomposing, into a set of transmission matrices, a traffic matrix for the network graph based on the set of network constraints, the set of transmission matrices representing the schedule over a frame period.

* * * * *